United States Patent
Zhang et al.

(10) Patent No.: US 7,032,153 B1
(45) Date of Patent: Apr. 18, 2006

(54) DYNAMIC AUTOMATIC RETRANSMISSION REQUEST IN WIRELESS ACCESS NETWORKS

(75) Inventors: Hang Zhang, Nepean (CA); Mo-Han Fong, L'Original (CA); Shalini S. Periyalwar, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 869 days.

(21) Appl. No.: 09/722,338

(22) Filed: Nov. 28, 2000

(51) Int. Cl.
*H04L 1/18* (2006.01)

(52) U.S. Cl. .................................... 714/749
(58) Field of Classification Search ........... 714/748, 714/749, 751; 370/328–335, 465–467, 352–356, 370/231, 310, 229, 468; 709/230, 231; 455/18
See application file for complete search history.

(56) References Cited

U.S. PATENT DOCUMENTS

| | | | | |
|---|---|---|---|---|
| 5,768,527 A | * | 6/1998 | Zhu et al. | 709/231 |
| 6,122,514 A | * | 9/2000 | Spaur et al. | 455/448 |
| 6,208,620 B1 | * | 3/2001 | Sen et al. | 370/231 |
| 6,438,723 B1 | * | 8/2002 | Kalliojarvi | |
| 6,473,399 B1 | * | 10/2002 | Johansson et al. | |
| 6,477,150 B1 | * | 11/2002 | Maggenti et al. | 370/312 |
| 6,618,375 B1 | * | 9/2003 | Rezaiifar et al. | 370/394 |

* cited by examiner

Primary Examiner—Guy J. Lamarre
(74) Attorney, Agent, or Firm—Anne Kinsman; Borden Ladner Gervais LLP

(57) ABSTRACT

A method and system for providing dynamic ARQ, on a per packet basis, in a wireless telecommunications access network. By taking into consideration both per packet QoS based on, for example, packet delay bound, and potential delays caused by retransmission, a dynamic NAK-based ARQ scheme is presented that dynamically adapts the retransmission parameters to the per packet QoS to provide improved radio link quality, particularly for non-delay sensitive services and applications. The ARQ parameters that are dynamically adjusted can include the number of retransmission rounds, and the number of retransmissions in each round.

12 Claims, 3 Drawing Sheets

DYNAMIC AUTOMATIC RETRANSMISSION REQUEST IN WIRELESS ACCESS NETWORKS

FIELD OF THE INVENTION

The present invention relates generally to improvements in wireless communications. More particularly, the present invention relates to a method and system for an automatic retransmission request (ARQ) scheme that dynamically adapts the retransmission parameters for each packet in response to predetermined conditions, such as the per packet quality of service (QoS).

BACKGROUND OF THE INVENTION

The design of current third generation (3G), and enhanced 3G, wireless access networks is driven by the need for high speed internet access. Increasingly, consumers are moving to wireless communications for the delivery of services and applications using TCP/IP (Transmission Control Protocol/Internet Protocol). This trend is growing with the increase in internet-enabled wireless devices available to users, including cellular telephones, Personal Digital Assistants (PDAs), and other devices. The applications that are now available or contemplated for wireless devices include access to the World Wide Web, video telephony, voice over IP, e-mail, etc.

However, wireless networks, whether fixed or mobile, suffer certain disadvantages over their wired counterparts, particularly in the delivery of IP applications. This is mainly due to the significantly greater lost or dropped packets in wireless networks, as compared to wireline. Such losses can be largely attributed to the changeable quality of the channel over which IP packets are sent. For example, the wireless channel condition is highly dependent on the location of the wireless terminal in relation to its base station, and extraneous external or atmospheric interference. The combination of these factors can have a significant effect on the delivery of data services over wireless channels.

An automatic retransmission request (ARQ) scheme is generally implemented in a wireless access network to enable packets that have not been received at a receiver to be retransmitted. Current 3G wireless link ARQ schemes are NAK-based schemes with static retransmission parameters determined on a per connection, or burst, basis. Such systems include the cdma2000 1xRTT standard, the Universal Mobile Telecommunications System (UMTS), High Data Rate (HDR), and Enhanced Data Rates for GSM Evolution (EDGE). For example, a static ARQ may support two rounds of retransmissions, and two retransmissions in each round, to meet a desired packet loss rate for the link. Such a static ARQ scheme has two main disadvantages for supporting packet applications. First, resources can be wasted. For example, if the first retransmission in a round has been correctly received, the second retransmission is a waste of radio resources. Secondly, there is a possibility that the delay introduced by retransmission will be longer than the tolerable packet delay for a given packet. This results from the fact that a static ARQ processes all packets in the same way, regardless of per packet QoS. This can result in intolerable delay for certain packets. For example, if a packet's delay margin does not permit two rounds of retransmission, the above static ARQ does not support the required QoS for that packet.

Therefore, to better support high speed wireless internet access, it is desirable that the ARQ design should support per packet QoS, instead of using static parameters, where the per packet QoS is, for example, a function of each packet's delay bound. In this way, system resources can be more efficiently utilized as compared to systems using a static ARQ scheme, and system capacity can be increased as a result.

SUMMARY OF THE INVENTION

It is an object of the present invention to obviate or mitigate at least one disadvantage of previous systems and methods for retransmitting packets in wireless access network. It is a particular object of the present invention to provide a system and method that permits automatic retransmission requests that are dynamically adapted to the per packet QoS.

In a first aspect, the present invention provides a method for retransmitting packets in a wireless communications network. The method begins with the receipt of a retransmission request for a packet. Typically, this retransmission request is in the form of a negative acknowledgement message. The packet has available at least one retransmission round, and has an available number of retransmissions. The available retransmission rounds are estimated as a function of the per packet QoS, such as the packet's delay bound, while the total number of retransmissions are estimated as a function of the wireless link QoS, such as the frame error rate. Depending on the number of retransmission rounds available to the packet, as determined by the round trip time over the wireless link, and the packet's total remaining number of retransmissions, retransmission parameters are determined. The packet is then retransmitted in accordance with the determined retransmission parameters. The available retransmissions for the packet are then updated. For example, when the packet delay margin provides sufficient time for more than one retransmission round, as determined by the estimated round trip time over a given link, only one retransmission is made, and a counter associated with the retransmission parameters is updated accordingly. When there is only sufficient time left to do one retransmission round, multiple retransmissions are made, up to a number that is equal to the remaining total number of retransmissions.

In another aspect, there is provided a radio link protocol engine that provides retransmission parameters for a packet having a predetermined per packet QoS. A radio link protocol automatic retransmission request engine determines retransmission parameters for the packet based on the predetermined per packet QoS and a predetermined wireless link QoS. A buffer stores the retransmission parameters for the packet. At each retransmission round that the packet undergoes, the retransmission parameters are recalculated and updated, as required.

In a further aspect, there is provided a wireless access network including the above-described radio link protocol automatic retransmission request engine and a scheduler for scheduling the packet for transmission over the wireless link.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention is a method for providing dynamic ARQ, on a per packet basis, in a wireless telecommunications access network. By taking into consideration both per packet QoS based on, for example, packet delay bound, and potential delays caused by retransmission, this invention proposes a dynamic NAK-based ARQ scheme that dynamically adapts the retransmission parameters to the per packet QoS to provide improved radio link quality, particularly for non-delay sensitive services and applications. The ARQ parameters that are dynamically adjusted can include the number of retransmission rounds, and the number of retransmissions in each round.

It is assumed that link adaptation is available in the wireless access network. Link adaptation is a protocol whereby the physical layer link modulation and code rate are dynamically changed based on current channel condition for each terminal, in order to satisfy a required wireless link QoS, determined according to a desired frame error rate (FER), bit error rate (BER) or block error rate (BLER), and to maximize data throughput. The result of link adaptation is the link mode for the channel.

Figure 1:
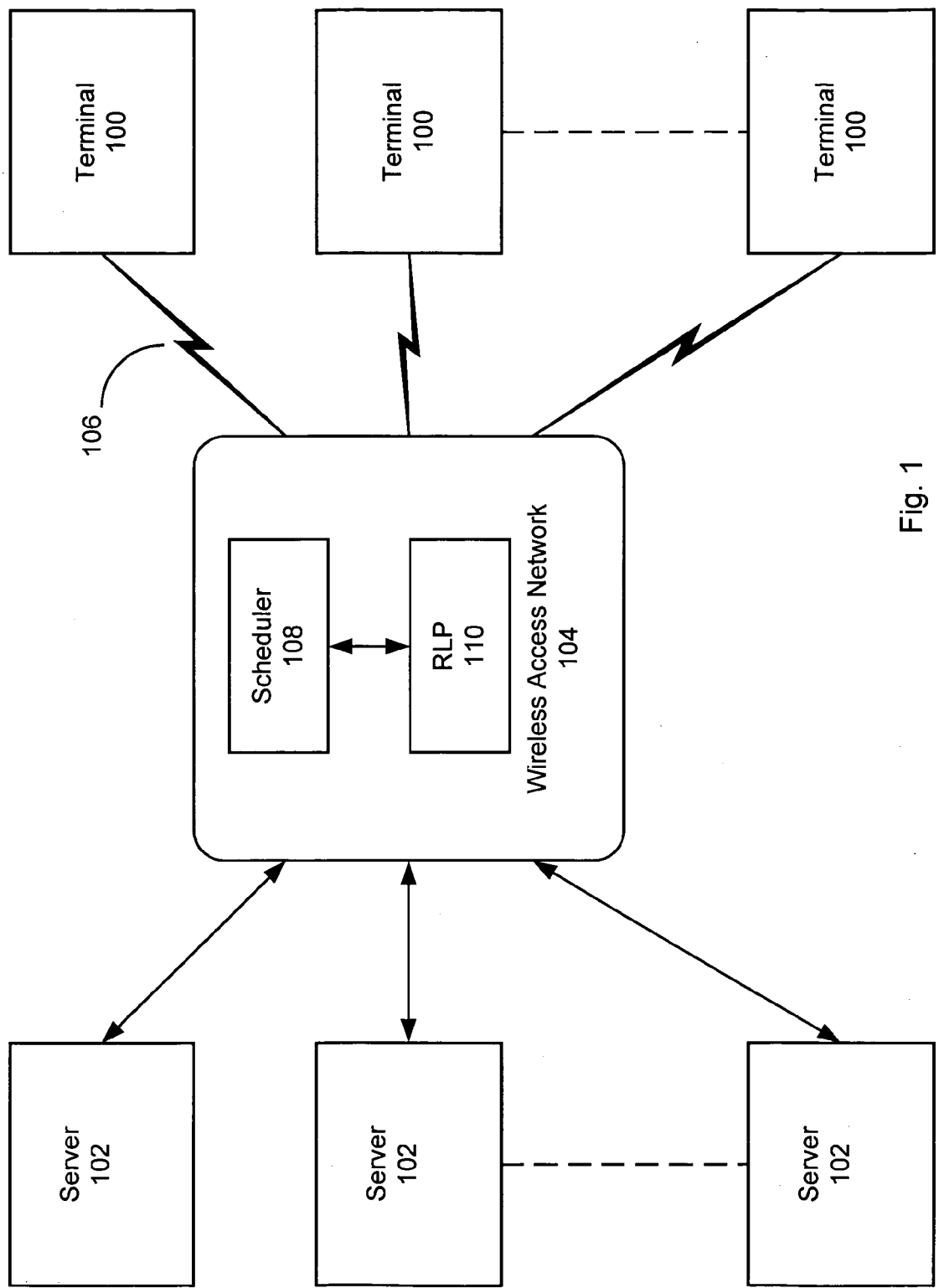
FIG. 1 is a block diagram of a wireless network configuration for communication between a wireless terminal and an application server.

FIG. 1 shows a typical wireless network configuration linking a number of wireless terminals 100 to a number of servers 102 through a wireless access network 104. As will be understood by those of skill in the art, FIG. 1 is a simplified overview of a wireless network configuration. Typically, a server 102, or terminal 100 in the case of terminal—terminal communications, sends data to the wireless access network 104. The wireless access network 104 schedules and formats the data for transmission over a radio link 106 to a terminal 100. Wireless access network 104 typically includes one or more base stations, or hubs, including suitable processing means and radio frequency hardware, as is well known to those of skill in the art. A scheduler 108, within the wireless access network 104, determines which packets are to be sent in a next frame. An access network radio link protocol (RLP) engine 110, in the data link layer, then encapsulates the data packets as RLP frames for transmission to appropriate terminals 100, and determines appropriate ARQ parameters.

The system and method of the present invention presume that the network is enabled for packet-based applications. As used herein, the terminal 100 can be any suitable wireless device, such as a cellular telephone or other wireless device enabled for packet-based applications, such as access to the World Wide Web and file transfer. The applications provided by application servers 102 can, if desired, support multiple users simultaneously, and multiple applications can be supported for each user or terminal 100. The payload data is provided to the link layer as packets by the application layer. It is assumed that the packets so received include information relating to their per packet QoS. The per packet QoS can be based on, for example, each packet's acceptable packet loss rate, packet delay bound and/or other packet parameters. As used herein, packet delay bound is the acceptable delay in the wireless link for a given packet. For example, a higher priority (i.e. higher QoS) could be given to packets from real time applications than to packets from non-real time applications if the per packet QoS was based on packet delay bound.

Figure 2:
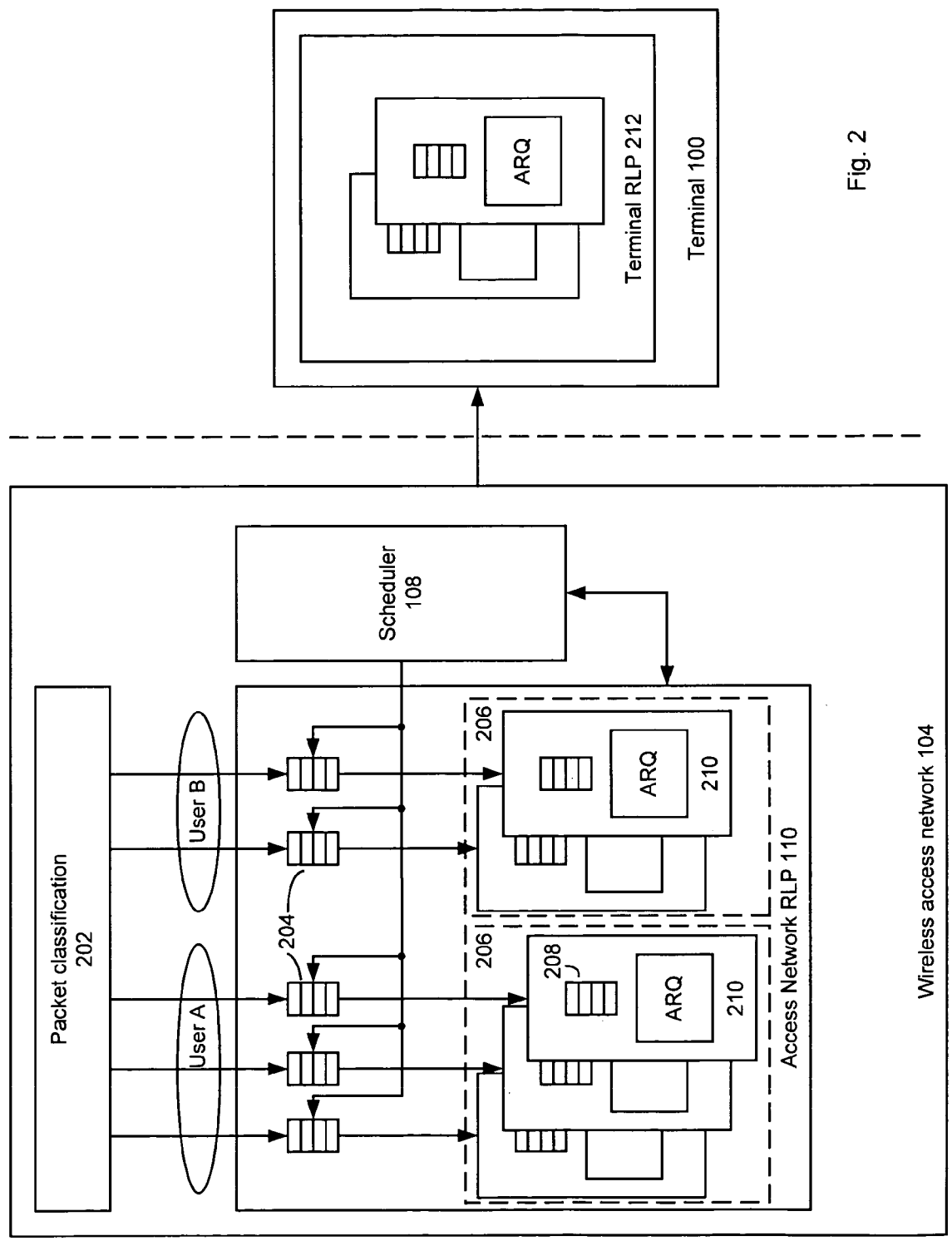
FIG. 2 is a more detailed block diagram of the wireless access network and terminal of FIG. 1.

FIG. 2 is a more detailed block diagram of the wireless access network 104 and a terminal 100, including the RLP engine 110 of the present invention. Data packets are received from the application layer destined to particular users or terminals 100. The packets are received by a packet classification unit 202 from the application layer, and classified into appropriate per packet QoS classes. In the illustrated example, a user A has packets is three different per packet QoS classes, while a user B has packets in two. The packet classification unit 202 classifies each packet according to its respective per packet QoS class, and stores the packets in buffer(s) 204 while they await transmission. Each user can have separate queues for each per packet QoS class (as shown), a single queue can be set up for each terminal, or other appropriate packet queuing can be implemented. The scheduler 108 schedules the packets according to a predetermined scheduling algorithm. In a presently preferred embodiment, the scheduling algorithm takes into consideration the per packet QoS of each packet. In a presently preferred embodiment, the scheduler 108 receives channel condition information from each terminal, from which it can determine an appropriate link mode for each channel. The scheduled packets are then passed to the RLP engine 110, where they are encapsulated as RLP frames, as is well known those of skill in the art. RLP engine 110 also includes an ARQ engine 206 that determines and maintains appropriate retransmission parameters for each scheduled packet, as will be further described below. Retransmission buffers 208 are maintained by ARQ engine 206 in the event that packets require retransmission. As indicated, RLP engine 110 and scheduler 108 share certain information, including the per packet QoS, identification of packets that must be retransmitted, and other information, as is known to those of skill in the art.

Generally, the ARQ engine 206 operates as follows. For each packet that is scheduled for transmission, the total number of available retransmissions N over a given wireless link is determined. The total number N can, for example, be estimated as a function the wireless link QoS. The transmitter side ARQ engine 206 maintains a retransmission counter k, which is initially set to N.

If a NAK message is received at the access network 104 from a terminal RLP 212 indicating that retransmission is required for a packet $P_i$, the transmitter side ARQ engine 206 checks the packet's delay margin. The packet delay margin is a measure of time that the packet can remain in the wireless link. In a presently preferred embodiment, the packet delay margin can be calculated by subtracting the current system time from the packet's finish time, which is a function of its arrive time in the wireless access network and its packet delay bound. If the packet's delay margin permits more than one retransmission round as determined from an estimated round trip time (RTT) between the receiver and transmitter, the erred packet is retransmitted once, and the retransmission counter is updated to k=k−1. If the packet's delay margin only permits one more retransmission round, then up to k retransmissions are made.

As shown in FIG. 2, in a presently preferred embodiment, the ARQ engine 206 consists of a number of logical ARQs 210 for each user, corresponding to each per packet QoS class determined by the packet classification unit 202. Generally, the appropriate QoS classes are communicated to the peer ARQ 210 at initialization. Each logical ARQ 210 is released at state transitioning out from active state of a terminal 100.

The particular format of the NAK message received by the wireless access network 104 is not critical to this invention. Generally, the information contained within the NAK message includes an identification of an erred packet(s) for which retransmission is requested. The information contained within the NAK message generally includes a sequence number identifying the erred packet, plus general control information. The actual frame format design for the NAK message depends on the physical layer design of the network. Alternatively, the present invention can be implemented for wireless access networks that are acknowledgement (ACK) based. In such a case, as is well known to those of skill in the art, the receiver sends an ACK message for each properly received packet. The transmitter tracks the receipt of the ACK messages, and retransmits packets for which no ACK has been received within a certain time, or after receipt of subsequent ACK messages. Such non-receipt of an ACK message can be seen to be equivalent to receipt of a NAK message.

Figure 3:
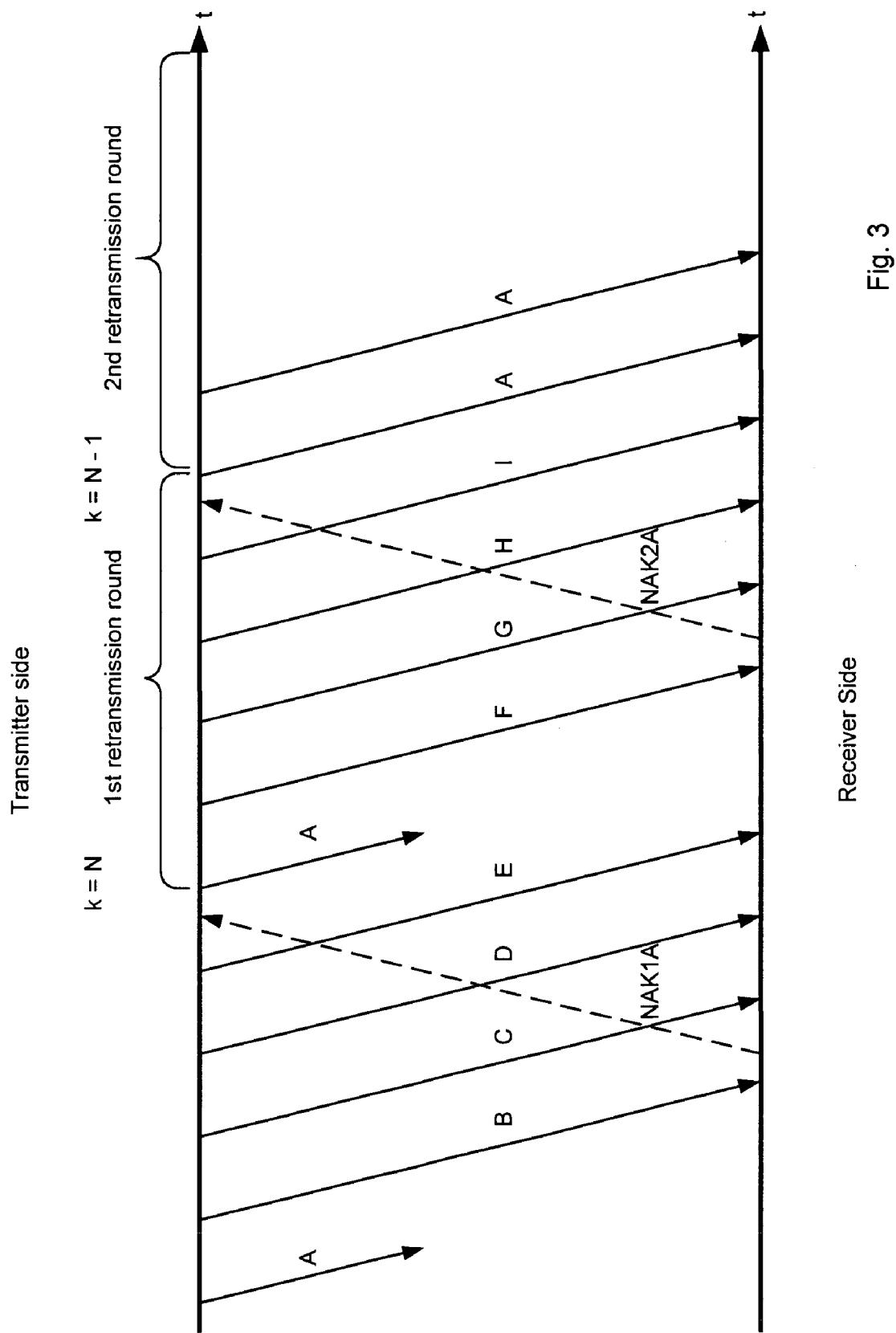
FIG. 3 is a schematic illustrating the operation of the method and system of the present invention.

Referring to FIGS. 2 and 3, the operation of the present invention will now be described in greater detail. The description that follows focuses on the purely layer 2 (L2) ARQ within wireless access network 104. As mentioned above a logical RLP ARQ 210 is created for each per packet QoS class. At initialization, the sender side logical RLP 210 sends corresponding QoS parameters, such as packet delay bound, to the receiver side RLP 212 for each per packet QoS class. As packets arrive at the access network RLP 110, the scheduler 108 labels each packet with a finish time. The scheduled packet is then processed by its appropriate RLP ARQ 210. The RLP ARQ 210 stores the packet's finish time, and determines the total number of retransmissions N for the packet based on the wireless link QoS and the packet loss rate. The RLP ARQ 210 maintains a retransmission counter k, initially set to N.

In a presently preferred embodiment, the finish time is the sum of the packet's arrive time in the wireless access network 104 and its packet delay bound, as determined by the packet's membership in a particular per packet QoS class. The finish time provides the latest time by which the packet must be received at its destination terminal. As determined at initialization, a L2 round trip time (RTT) is also estimated for the link between the wireless access network 100 and each terminal 100.

As shown in FIG. 3, a number of packets A, B, C, D . . . are being sent from a transmitter side, typically the wireless access network 104, to a receiver side, typically a terminal 100. For purposes of illustration, each packet has a per packet QoS that imposes a packet delay bound of, for example, 3 s. The packet loss rate for the wireless link is $10^{-4}$, and the required FER is $10^{-1}$. It is assumed that each packet is encapsulated in a single RLP frame. Therefore, the total number of retransmissions available for each packet can be estimated as N=3. Packet A is sent, but not received at the receiver side. A NAK message NAK1A is then sent from the receiver side to the sender side. Whenever the access network RLP 110 receives a NAK message for a particular packet, or part of a packet, the packet's delay margin is calculated. In the illustrated example, the delay margin for packet A is greater than 1.5 times the estimated RTT, therefore there is at least one more opportunity to retransmit the packet, and the logical ARQ 210 generates retransmission parameters to effect a single retransmission of packet A in this retransmission round. The retransmission counter k, initially set to k=N=3, is then decremented by "1" to k=2.

The retransmitted packet A is also not received at the sender side, and a second NAK message NAK2A is sent to the sender side. On receipt of NAK2A the delay margin for packet A is again calculated, and is found to be less than 1.5 times the estimated RTT. Therefore, in order to meet the packet's per packet QoS, only one last retransmission round is possible and retransmission parameters are determined such that all remaining retransmissions are sent in this last available retransmission round. The remaining number of retransmissions is equal to the current value of retransmission counter k. Therefore, since k=2, two retransmissions of packet A are made in this final round. If the packet's finish time has expired, no retransmissions are made.

The dynamic ARQ of the present invention does not significantly increase retransmit complexity, but improves system capacity by selectively limiting the number of retransmissions in a retransmission round. The adaptive ARQ of the present invention provides an optimal design with increased system efficiency by avoiding unnecessary retransmissions and providing more reliable QoS support by matching retransmission parameters with real time packet delay margin. This design is applicable to, and significantly enhances 3G systems such as cdma2000, UMTS and HDR. It is also applicable to future high-speed wireless systems, whether fixed or mobile.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for retransmitting packets in a wireless communications network, comprising:
   (a) receiving a retransmission request for a packet having available at least one retransmission rounds and a number of retransmissions;
   (b) determining within a radio link protocol automatic retransmission request engine, from the at least one retransmission rounds and the number of retransmissions, retransmission parameters for the packet, the at least one retransmission rounds being estimated as a function of per packet quality of service and the number of retransmissions being estimated as a function of a wireless link quality of service;
   (c) retransmitting the packet at the determined retransmission parameters; and
   (d) updating the number of retransmissions.

2. The method as in claim 1, wherein receiving the retransmission request includes receiving a negative acknowledgement message.

3. The method as in claim 1 wherein determining the retransmission parameters includes determining that a packet delay margin permits more than one retransmission rounds.

4. The method as in claim 3, wherein retransmitting the packet includes retransmitting one instance of the packet.

5. The method as in claim 1, wherein determining the retransmission parameters includes determining that a packet delay margin permits only one retransmission round.

6. The method as in claim 5, wherein retransmitting the packet includes retransmitting the instances of the packet equal to the number of retransmissions.

7. The method of claim 1, further including estimating a total number of retransmissions.

8. The method of claim 7, wherein estimating the total number of retransmissions includes considering the wireless link quality of service and a packet loss rate.

9. A radio link protocol engine for providing retransmission parameters for a packet in response to an automatic retransmission request; comprising:
- a buffer for storing retransmission parameters for a packet having a predetermined per packet quality of service, the retransmission parameters including available retransmission rounds and total number of retransmissions;
- a radio link protocol automatic retransmission request engine for determining the retransmission parameters for the packet as a function of the predetermined per packet quality of service and a wireless link quality of service, where the available retransmission rounds are estimated as a function of the predetermined per packet quality of service and the total number of available retransmissions are estimated as a function of the wireless link quality of service.

10. The radio link protocol engine of claim 9, wherein the radio link protocol automatic retransmission request engine includes a retransmission counter.

11. A wireless access network, comprising:
- a scheduler for scheduling a packet, having a predetermined per packet quality of service, for transmission over a radio link having a predetermined wireless link quality of service;
- a radio link protocol engine for providing retransmission parameters for the packet in response to an automatic retransmission request, the retransmission parameters including available retransmission rounds and total number of retransmissions the radio link protocol engine including a buffer for storing the retransmission parameters for the packet; and
- a radio link protocol automatic retransmission request engine for determining the retransmission parameters for the packet as a function of the predetermined per packet quality of service and the predetermined wireless link quality of service, where the available retransmission rounds are estimated as a function of the predetermined per packet quality of service and the total number of available retransmissions are estimated as a function of the wireless link quality of service.

12. The wireless access network of claim 11, wherein the radio link protocol engine automatic retransmission request engine includes a retransmission counter.

* * * * *